US010810648B2

(12) United States Patent
Herring et al.

(10) Patent No.: US 10,810,648 B2
(45) Date of Patent: Oct. 20, 2020

(54) METHOD, PRODUCT, AND SYSTEM FOR UNMANNED VEHICLES IN RETAIL ENVIRONMENTS

(71) Applicant: Toshiba Global Commerce Solutions Holdings Corporation, Tokyo (JP)

(72) Inventors: Dean Frederick Herring, Youngsville, NC (US); Brad Matthew Johnson, Raleigh, NC (US); Ankit Singh, Morrisville, NC (US); Jeffrey John Smith, Raleigh, NC (US); Seth Teeples, Cary, NC (US)

(73) Assignee: Toshiba Global Commerce Solutions, Tokyo (JP)

( * ) Notice: Subject to any disclaimer, the term of this patent is extended or adjusted under 35 U.S.C. 154(b) by 973 days.

(21) Appl. No.: 14/883,146

(22) Filed: Oct. 14, 2015

(65) Prior Publication Data

US 2016/0110701 A1    Apr. 21, 2016

Related U.S. Application Data

(60) Provisional application No. 62/064,323, filed on Oct. 15, 2014.

(51) Int. Cl.
*G06Q 30/00*    (2012.01)
*G06Q 30/06*    (2012.01)
(Continued)

(52) U.S. Cl.
CPC ......... *G06Q 30/0623* (2013.01); *G01B 11/00* (2013.01); *G01G 19/4144* (2013.01);
(Continued)

(58) Field of Classification Search
CPC ........... A47F 3/08; B60P 3/06; G05D 1/0088; G05D 2201/0216; G05D 1/0246;
(Continued)

(56) References Cited

U.S. PATENT DOCUMENTS 5,497,314 A * 3/1996 Novak ................... A47F 9/046
                                                235/383
6,296,186 B1 * 10/2001 Spencer ................ G06K 9/209
                                                235/462.01
(Continued)

FOREIGN PATENT DOCUMENTS

EP    2372627 A2 * 10/2011 ............... G06G 1/14
WO    2014071465 A1    5/2014

OTHER PUBLICATIONS

Arabian Business, "UAE firm develops drone to tackle stock management issues", Sep. 14, 2014, www.arabianbusiness.com/uae-firm-develops-drone-tackle-stock-management-issues-564340.html?service=printer&page=.

(Continued)

*Primary Examiner* — Florian M Zeender
*Assistant Examiner* — Milena Racic
(74) *Attorney, Agent, or Firm* — Patterson + Sheridan, LLP (57) ABSTRACT

Methods, computer program products, and systems for operating a retail environment using unmanned vehicles are provided. The methods include observing a person interacting with one or more items with a camera carried by an unmanned vehicle, identifying the one or more items based on data received from the unmanned vehicle, and adding each identified item to a transaction for the person. The methods can further include charging the person for the transaction, presenting promotions, retrieving a desired item, answering questions, following a person, guiding a customer to a location, and showing images of inventory items.

19 Claims, 6 Drawing Sheets

(51) Int. Cl.
| | |
|---|---|
| G07G 1/00 | (2006.01) |
| G06Q 20/20 | (2012.01) |
| G06Q 10/08 | (2012.01) |
| G06T 7/66 | (2017.01) |
| G01B 11/00 | (2006.01) |
| G01G 19/414 | (2006.01) |
| G01S 19/13 | (2010.01) |
| G06F 1/16 | (2006.01) |
| G06F 3/01 | (2006.01) |
| G06K 9/00 | (2006.01) |
| G06K 9/20 | (2006.01) |
| G06K 9/46 | (2006.01) |
| G06K 9/62 | (2006.01) |
| G06Q 20/18 | (2012.01) |
| G06Q 30/02 | (2012.01) |
| G06T 11/60 | (2006.01) |
| H04N 5/225 | (2006.01) |
| H04N 5/232 | (2006.01) |
| H04N 7/18 | (2006.01) |
| G06Q 20/32 | (2012.01) |
| G06K 9/78 | (2006.01) |
| G01G 19/40 | (2006.01) |
| G01B 11/02 | (2006.01) |

(52) U.S. Cl.
 CPC .............. *G01S 19/13* (2013.01); *G06F 1/163* (2013.01); *G06F 3/012* (2013.01); *G06F 3/013* (2013.01); *G06K 9/00221* (2013.01); *G06K 9/00255* (2013.01); *G06K 9/00288* (2013.01); *G06K 9/00362* (2013.01); *G06K 9/00536* (2013.01); *G06K 9/00577* (2013.01); *G06K 9/00624* (2013.01); *G06K 9/209* (2013.01); *G06K 9/46* (2013.01); *G06K 9/6201* (2013.01); *G06K 9/6267* (2013.01); *G06K 9/78* (2013.01); *G06Q 10/087* (2013.01); *G06Q 20/18* (2013.01); *G06Q 20/204* (2013.01); *G06Q 20/208* (2013.01); *G06Q 20/209* (2013.01); *G06Q 20/322* (2013.01); *G06Q 30/016* (2013.01); *G06Q 30/0224* (2013.01); *G06Q 30/0235* (2013.01); *G06Q 30/0251* (2013.01); *G06Q 30/0269* (2013.01); *G06Q 30/0609* (2013.01); *G06Q 30/0629* (2013.01); *G06Q 30/0631* (2013.01); *G06Q 30/0633* (2013.01); *G06Q 30/0635* (2013.01); *G06Q 30/0639* (2013.01); *G06T 7/66* (2017.01); *G06T 11/60* (2013.01); *G07G 1/0045* (2013.01); *G07G 1/0054* (2013.01); *G07G 1/0063* (2013.01); *G07G 1/0072* (2013.01); *H04N 5/225* (2013.01); *H04N 5/232* (2013.01); *H04N 7/181* (2013.01); *G01B 11/02* (2013.01); *G01G 19/40* (2013.01); *G06K 2009/0328* (2013.01); *G06K 2209/17* (2013.01); *G06T 2207/30232* (2013.01)

(58) Field of Classification Search
 CPC .............. G06Q 30/0639; G06Q 10/087; G06Q 30/0281; H04N 7/183; H04W 4/043; H04W 4/02; G06K 9/00671; G06K 9/00771; G06K 9/78; G06T 7/66; G06T 7/0004; G06T 7/73; Y10S 901/01; B66F 9/063; B64C 2201/127
 See application file for complete search history.

(56) References Cited

U.S. PATENT DOCUMENTS

| | | | | |
|---|---|---|---|---|
| 7,389,918 | B2 * | 6/2008 | Wike, Jr. | A47F 9/048 235/383 |
| 7,516,888 | B1 * | 4/2009 | Kundu | G06Q 20/00 235/375 |
| 7,631,808 | B2 * | 12/2009 | Kundu | G06Q 20/00 235/375 |
| 7,648,068 | B2 | 1/2010 | Silverbrook et al. | |
| 7,660,747 | B2 | 2/2010 | Brice et al. | |
| 7,733,230 | B2 | 6/2010 | Bomber et al. | |
| 7,845,554 | B2 * | 12/2010 | Jacobs | G07G 1/01 235/383 |
| 7,853,477 | B2 | 12/2010 | O'Shea et al. | |
| 7,909,248 | B1 * | 3/2011 | Goncalves | G07G 1/0063 235/375 |
| 8,214,088 | B2 | 7/2012 | Lefebure | |
| 8,320,633 | B2 * | 11/2012 | Ross | G06K 9/2018 382/110 |
| 8,430,311 | B2 * | 4/2013 | Ostrowski | A47F 11/10 235/383 |
| 8,448,858 | B1 * | 5/2013 | Kundu | G07F 17/3241 235/375 |
| 8,494,909 | B2 * | 7/2013 | Goncalves | G06Q 20/203 382/100 |
| 8,498,903 | B2 * | 7/2013 | Edwards | G07G 1/0054 177/25.15 |
| 8,560,357 | B2 * | 10/2013 | Sickenius | G06Q 30/02 705/14.58 |
| 8,571,298 | B2 * | 10/2013 | McQueen | G06K 9/00 235/378 |
| 8,615,105 | B1 * | 12/2013 | Cheng | G06K 9/00771 382/103 |
| 8,761,964 | B2 | 6/2014 | Lee et al. | |
| 8,818,572 | B1 | 8/2014 | Tofte et al. | |
| 9,177,224 | B1 * | 11/2015 | Heller | G06K 9/52 |
| 9,424,601 | B2 * | 8/2016 | Brosnan | G01G 19/4144 |
| 9,827,683 | B1 * | 11/2017 | Hance | G06Q 10/0875 |
| 9,892,438 | B1 * | 2/2018 | Kundu | G06Q 30/0609 |
| 2002/0138374 | A1 * | 9/2002 | Jennings | G06K 9/00 705/29 |
| 2002/0187774 | A1 * | 12/2002 | Ritter | G06Q 30/06 455/414.1 |
| 2006/0032915 | A1 * | 2/2006 | Schwartz | G06Q 20/208 235/383 |
| 2007/0262149 | A1 * | 11/2007 | Knowles | G06K 7/10693 235/462.01 |
| 2009/0039164 | A1 * | 2/2009 | Herwig | G07G 1/009 235/462.41 |
| 2009/0160975 | A1 * | 6/2009 | Kwan | H04N 5/77 348/231.99 |
| 2010/0002902 | A1 * | 1/2010 | Landers, Jr. | G06Q 20/202 382/100 |
| 2010/0049368 | A1 | 2/2010 | Chen | |
| 2012/0037697 | A1 * | 2/2012 | Boone | G06F 17/30876 235/375 |
| 2012/0321146 | A1 * | 12/2012 | Kundu | G06Q 30/06 382/118 |
| 2014/0032034 | A1 | 1/2014 | Raptopoulos et al. | |
| 2014/0152507 | A1 | 6/2014 | McAllister | |
| 2014/0192193 | A1 | 7/2014 | Zufferey et al. | |
| 2014/0244437 | A1 * | 8/2014 | Longino | G06Q 30/0639 705/26.41 |
| 2014/0247116 | A1 | 9/2014 | Davidson | |
| 2014/0254896 | A1 | 9/2014 | Zhou et al. | |
| 2014/0277854 | A1 | 9/2014 | Jones et al. | |
| 2014/0304107 | A1 | 10/2014 | McAllister | |
| 2014/0365333 | A1 * | 12/2014 | Hurewitz | G06Q 30/0643 705/26.9 |
| 2015/0012396 | A1 * | 1/2015 | Puerini | G06Q 10/0875 705/28 |
| 2015/0019391 | A1 * | 1/2015 | Kumar | G07G 1/0036 705/28 |

(56) References Cited

U.S. PATENT DOCUMENTS

| | | | |
|---|---|---|---|
| 2015/0025929 A1* | 1/2015 | Abboud et al. | ............................... G06Q 10/063114 705/7.15 |
| 2015/0029339 A1* | 1/2015 | Kobres | .................. H04N 7/181 348/150 |
| 2015/0120094 A1* | 4/2015 | Kimchi | .................... G05D 1/00 701/3 |
| 2015/0277440 A1* | 10/2015 | Kimchi | ................ G08G 5/0078 701/26 |
| 2016/0023675 A1* | 1/2016 | Hannah | .................. B60L 58/12 701/2 |
| 2017/0193434 A1* | 7/2017 | Shah | .................... G05D 1/0212 |
| 2018/0068357 A1* | 3/2018 | High | .................. G06Q 30/0281 |

OTHER PUBLICATIONS

Wiseman, DIY Drones, "Voice Controlled Drone", http://diydrones.com/profiles/blogs/voice-controlled-drone.

\* cited by examiner

METHOD, PRODUCT, AND SYSTEM FOR UNMANNED VEHICLES IN RETAIL ENVIRONMENTS

CROSS-REFERENCE TO RELATED APPLICATIONS

This application claims benefit of U.S. Provisional Patent Application Ser. No. 62/064,323, filed Oct. 15, 2014, entitled "Integrated Shopping Environment," which is herein incorporated by reference.

BACKGROUND

The present disclosure relates to techniques to assist persons in a store and/or operate a retail environment by using unmanned vehicles.

In some stores, customers complete purchases by presenting items at a bar-code reader included at a self-service check-out system. Items without bar-codes (e.g., produce) are identified by a person (e.g., the customer or a store associate), who inputs a code assigned to a given item into the check-out system.

When a customer needs assistance (e.g., in finding an item), the customer typically consults with a store associate. The customer may push a button at a kiosk to summon a store associate or seek out the store associate. Frequently, the first store associate to interact with the customer is unable to provide the needed assistance and another store associate must be summoned.

Therefore, there is a need for improving methods of operating retail environments and reducing intervention from store personnel.

To facilitate understanding, identical reference numerals have been used, where possible, to designate identical elements that are common to the drawings. Elements disclosed in one embodiment may be utilized with other embodiments. The drawings should not be understood as being drawn to scale, unless specifically noted. Also, the drawings are often simplified and details or components omitted for clarity of presentation and explanation. The drawings and discussion serve to explain principles discussed below.

DETAILED DESCRIPTION

Aspects of the present disclosure relate to enhancing the experience of customers in a store by using unmanned vehicles (e.g., drones). In one embodiment, a retailer may deploy unmanned vehicles as part of a point of sale (POS) system to assist customers or store associates (e.g., by finding or retrieving items). Further, customer-supplied unmanned vehicles may interact with retailer-supplied unmanned vehicles.

Embodiments presented herein disclose techniques to enhance a customer's shopping experience in a store. For example, a retailer may use unmanned vehicles to identify customers as part of a point of sale (POS) system, enabling the customers to make purchases by gathering items and having the cost charged to a credit card. In one embodiment, the customer's credit card is determined based on the POS system recognizing the customer from images captured by the unmanned vehicle.

In another example, a retailer may use unmanned vehicles to identify items, enabling a POS system to charge for the items. Unmanned vehicles that can identify items may also be used by a retailer to retrieve items requested by a customer or store associate. In still another example, a retailer may use unmanned vehicles as part of a POS system to observe behaviors of the customers. The unmanned vehicles may present information (e.g., promotional information) or respond to gestures and spoken requests (e.g., by adding an item to the customer's order).

While many of the examples presented herein are described in terms of unmanned aerial vehicles (UAVs), the present disclosure is not limited to unmanned aerial vehicles and also includes embodiments using unmanned vehicles of other types, such as wheeled vehicles, tracked vehicles, vehicles riding on tracks (e.g., rails), vehicles suspended from overhead tracks, and walking vehicles.

Figure 1:
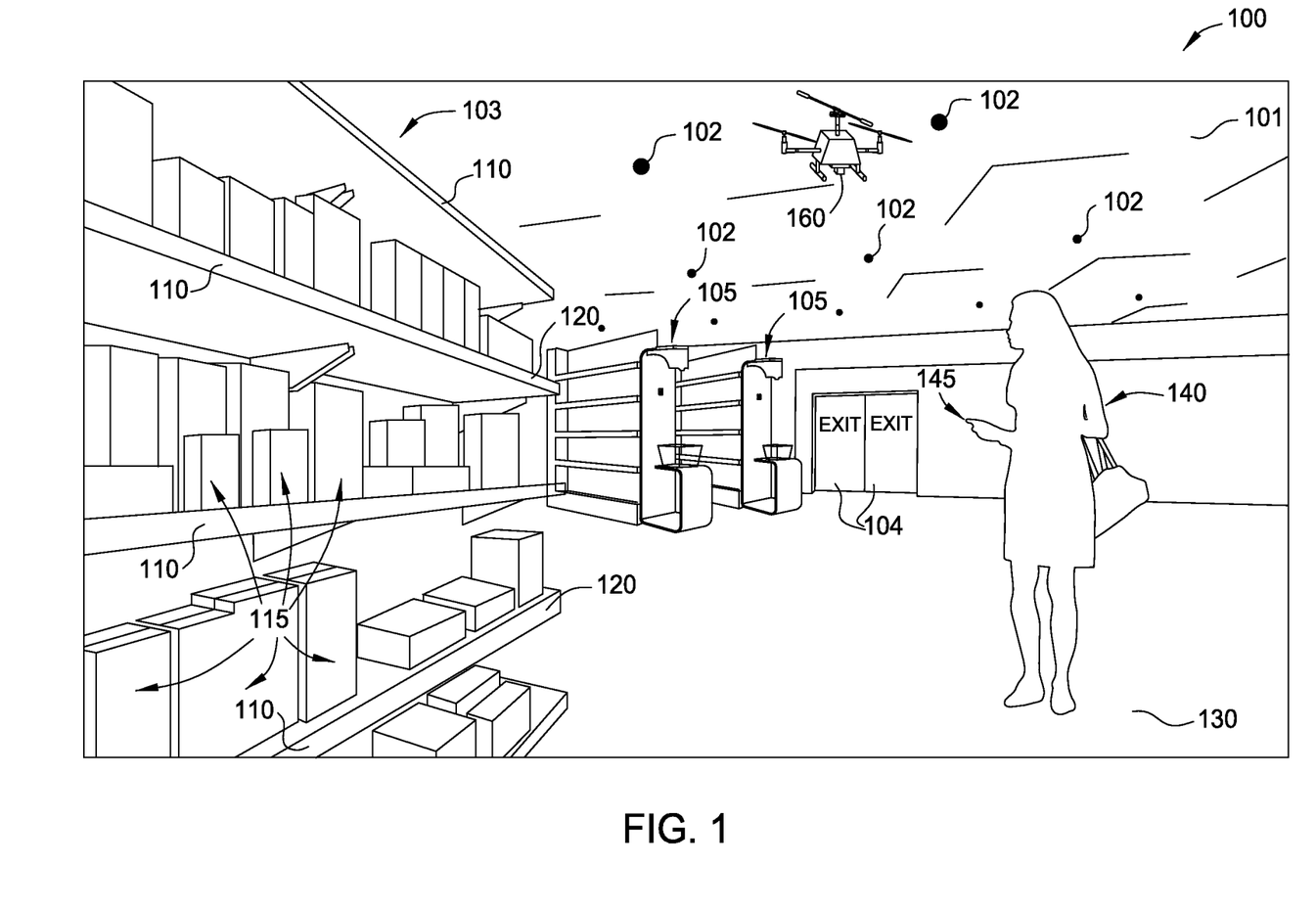
FIG. 1 illustrates an exemplary store, according to aspects of the present disclosure.

FIG. 1 illustrates an exemplary store 100, according to embodiments of the present disclosure. Customers such as customer 140 may enter the store through one of the doors 104. Customers may select items for purchase from shelving units 103 and place the selected items in a cart or basket. When a customer is done selecting items and ready to pay for the items, the customer can proceed to a point of sale (POS) terminal 105 (e.g., a checkout line). At the POS terminal, the customer or a store associate can identify (e.g., by scanning a bar-code), to the POS terminal, each of the selected items. The POS terminal determines a price for each of the items, generates a record of the transaction, and may accept payment (e.g., a credit card payment) for the transaction. The customer may also be identified (e.g., by presentation of a loyalty card) by the POS terminal, and the POS terminal may alter the transaction (e.g., by applying one or more discounts) based on the identity of the customer. When the customer has completed the transaction and is ready to leave the store, the customer exits through one of the doors 104.

As shown, the store 100 may include sensor modules 102 in the ceiling 101. Sensor modules 102 represent a variety of types of sensors, such as visual sensors (e.g., cameras), audio sensors (e.g., microphones), and so forth. Sensor modules 102 may also include actuating devices (e.g., motors) for orienting (e.g., moving, rotating, and tilting) the sensors. Sensor modules 102 or individual sensors may also be present at other locations within the store 100, e.g., locations below, within, or above the floor 130, within other structural components of the store 100 such as a shelving unit 103 or walls, etc. In some embodiments, sensors may be disposed on, within, or near product display areas such as shelving unit 103. The sensors 102 may also be oriented toward a location where a customer is expected to interact with items to provide data about a customer's interaction, such as determining a customer's actions.

Store 100 also includes POS terminals 105 (e.g., kiosks). Generally, POS terminals 105 allow customers to purchase items or perform other shopping-related tasks. Each POS terminal 105 may include computing systems and I/O devices, such as visual displays, audio speakers, cameras, microphones, etc. for interacting with the customer. In some aspects, a customer 140 may use a mobile computing device, such as a smartphone 145, to communicate with the POS terminal 105 to complete a purchase transaction. The customer 140 may also connect mobile computing device 145 with a network to perform other activities. For example, the mobile computing device 145 may execute a store application (i.e., an app) connected to networked computing systems using wireless networks accessible within the store (e.g., over Wi-Fi or Bluetooth). In one embodiment, the mobile computing device 145 may communicate with the POS terminal 105 when brought within range, e.g., using Bluetooth or near-field communication (NFC) tags.

Store 100 also includes shelving units 103 with shelves 110 and items 115 available for selection, purchase, etc. Multiple shelving units 103 may be disposed in a particular arrangement in the store 100 to form aisles. In some embodiments, the shelving unit 103 may include attached and/or embedded visual sensors or other sensor devices or I/O devices. The sensors or devices may communicate with a customer's smartphone 145 or other networked computing devices within the store 100. For example, the front portions 120 of shelves 110 may include video sensors oriented outward from the shelving unit 103, which capture customer interactions with items 115 on the shelving unit 105. Data from the video sensors may be provided to servers for storage and analysis.

Store 100 also includes one or more unmanned vehicles 160. A unmanned vehicle may follow a customer throughout the store or remain in one area of the store. When entering store 100, a customer may indicate that the customer desires to be assisted by an unmanned vehicle (e.g., by starting an app on a mobile device or walking through a lane marked on the floor). Customers already in the store may also summon an unmanned vehicle for assistance, e.g., by pushing a button at a kiosk.

Figure 2:
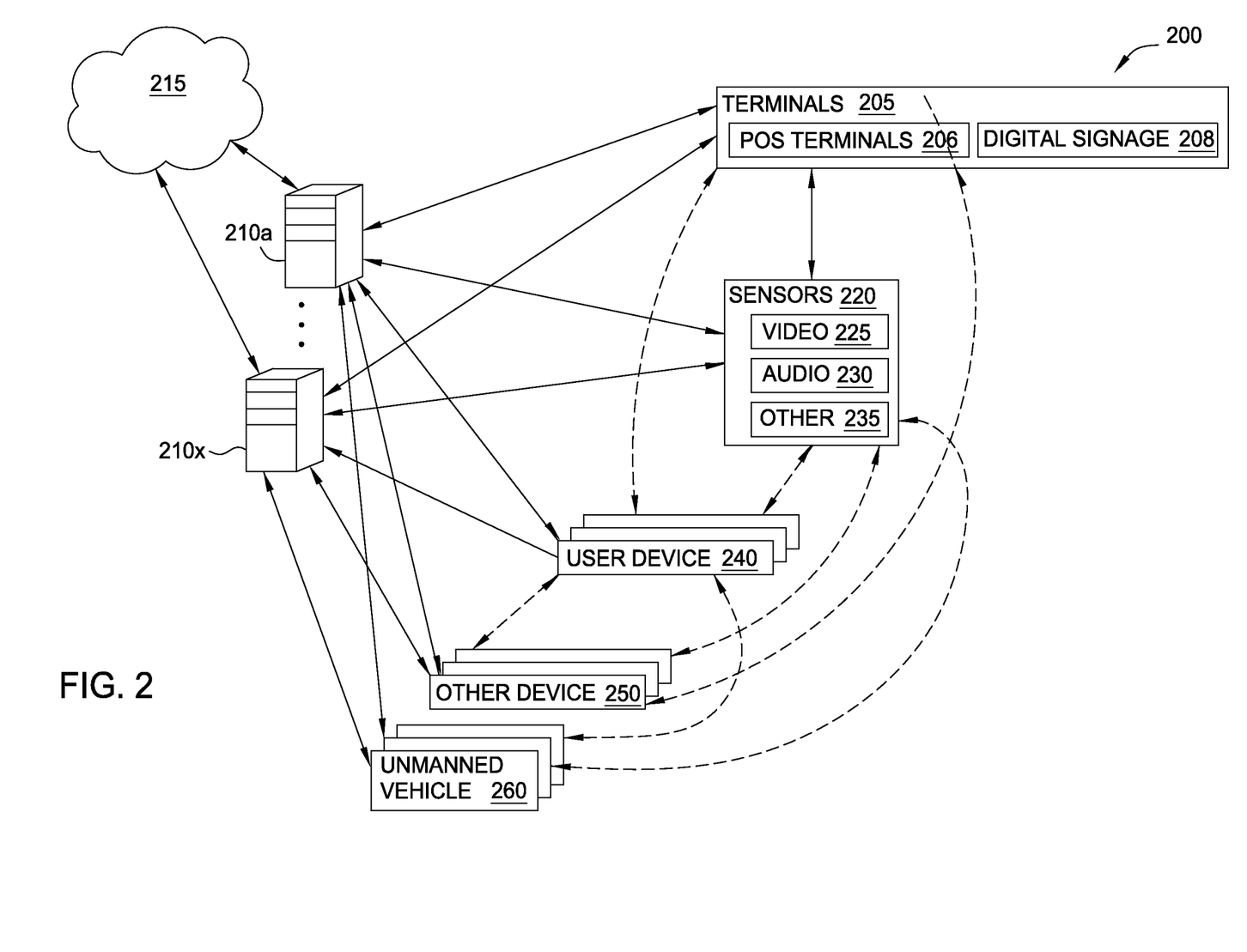
FIG. 2 illustrates exemplary equipment used in a store, according to aspects of the present disclosure.

FIG. 2 illustrates equipment used in a store 200, according to one embodiment. Store 200 may be similar to store 100. As shown, store 200 includes terminals 205, servers 210a through 210x coupled with a network 215, sensors 220, user devices 240, other devices 250, and unmanned vehicles 260.

Terminals 205 generally include any structure customers use to interact with the store 200. The terminals 205 may include computing systems, portions of computing systems, or devices controllable by computing systems, including the POS terminals 105 shown in FIG. 1. In one example, a terminal includes a computing device, a video display, audio speaker(s), and input devices (e.g., mouse, keyboard, touchscreen, etc). In another example, a terminal may include a visual display and associated hardware, but a computing device providing data for display is located separately from the terminal. In some embodiments, terminals 205 may be implemented as standalone devices, such as a kiosk (e.g., POS terminals 105 shown in FIG. 1) on the store floor or a display screen on a shelf or platform. In some embodiments, terminals 205 may be integrated with other components of the store 200, such as input or output devices included with shelving or other structural components in the store (e.g., components used to display or store products). In some embodiments, terminals 205 may be modular and easily attached to elements of the store 200.

Generally, terminals 205 may be distributed throughout the store 200, for example, digital signage 208 disposed throughout the store, such as in or near aisles, endcaps, displays, and/or shelving. Point of Sale (POS) terminals 206 provide checkout functionality, allowing the customer to complete his/her shopping transaction (e.g., to pay for selected items). In some embodiments, terminals 205 may function in multiple modes, depending on context. For example, a terminal 205 may operate in a digital signage mode and when engaged by a customer, operate as a POS terminal.

Servers 210a through 210x generally include processors, memory, communications capabilities, storage, and applications which support the commercial operation of the store 200. Servers 210a through 210x communicate using various wired and/or wireless communications methods with terminals 205, sensors 220, and with other networked devices such as user devices 240 and other devices 250.

Sensors 220 may include video sensors 225, audio sensors 230, and other sensors 235. The other sensors 235 are generally capable of providing information about customer interactions with the store, e.g., location sensors, weight sensors, and so forth. Sensors 220 may be deployed throughout the store 200 in fixed (e.g., locations 102 and POS terminals 105 shown in FIG. 1) and/or movable locations. For example, sensors 220 may be mounted in walls, floors, ceilings, displays, or other devices or in shopping carts or baskets. In one embodiment, sensors 220 may include adjustable position sensor devices, such as motorized cameras attached to a rail, wire, or frame. Sensors 220 may also include sensing means in user devices 240 or other devices 250 (which in some cases may include body-worn or carried devices). User devices 240 and other devices 250 may include passive or actively-powered devices capable of communicating with networked devices in the store 200. One example of a passive device is an NFC tag. Active devices may include mobile computing devices, such as smartphones or tablets, or wearable devices. The user devices 240 generally include devices owned or possessed by customers (e.g., mobile computing device 145), while the other devices 250 generally include devices owned by the retailer or other administrator of the store 200. In some cases, employees may carry and use the other devices 250 in assisting customers. User devices 240 and other devices 250 may execute applications or other program code that generally enables various features provided by the servers or other networked computing devices.

Unmanned vehicles 260 may communicate via the network 215 (or a separate network). The network 215 used to communicate and control the unmanned vehicles may be a wireless (e.g., Wi-Fi or Bluetooth) portion of a store network that also has wired portions. Optionally, the unmanned vehicles may be controlled via a first radio access technology (RAT), while the unmanned vehicles communicate (e.g., transmit video or other data) via a second RAT. Additionally, the unmanned vehicles may be controlled via non-radio wireless (e.g., infrared) signaling.

Flight paths of UAVs may be controlled by flight commands (e.g., turn right 30°, ascend two feet) issued by the servers 210a through 210x. A server controlling unmanned vehicles may be a special-purpose computer or other device that coordinates the activities of the unmanned vehicles. The unmanned vehicles may also communicate with each other to avoid colliding and to otherwise coordinate their activities.

Additionally or alternatively, the unmanned vehicles may have some autonomy in determining maneuvers to use in obeying navigation commands (e.g., proceed to location X) and other commands. One or more of the servers 210*a* through 210*x* may issue navigation and other commands to one or more unmanned vehicles, which determine how to obey the commands. The unmanned vehicles may also communicate with each other to avoid colliding and otherwise coordinate their activities.

The unmanned vehicles may accomplish the functions of sensors 220, user terminals 205, and other devices 250. Unmanned vehicles may also carry sensors 220, user terminals 205, and other devices 250. For example, an unmanned vehicle may be equipped with a video camera and microphone, and the unmanned vehicle may capture pictures, video imagery, and sounds (e.g., spoken requests from customers) for use by systems within the store. Also, an unmanned vehicle may be equipped with speakers, display screens, and/or touch screens, to enable the unmanned vehicle to communicate with customers and/or store associates. In a second example, an unmanned vehicle may be equipped with a bar-code reader, NFC reader, and/or credit card reader to enable the unmanned vehicle to function as a POS terminal.

Figure 3:
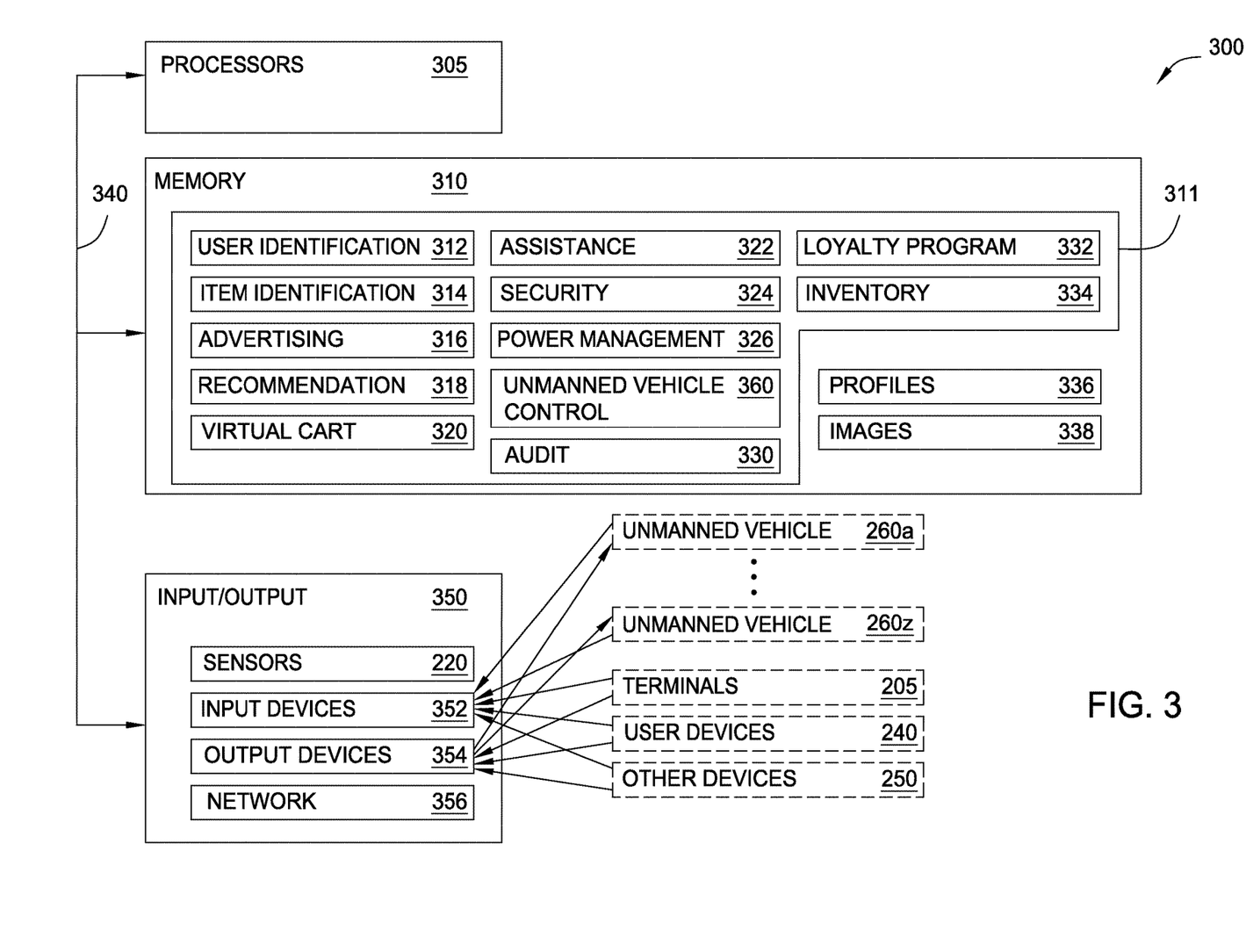
FIG. 3 illustrates an exemplary point of sale (POS) system, according to aspects of the present disclosure.

FIG. 3 illustrates an exemplary POS system 300, according to one embodiment. Generally, the system 300 corresponds to the store 200 described above. System 300 includes one or more processors 305, memory 310, input/output modules 350, and one or more connections 340. In one embodiment, system 300 may be included in a single computing device, and the connection 340 may be a common bus. In other embodiments, system 300 is distributed and includes a plurality of discrete computing devices connected over a network. Processors 305 may include any processing element suitable for performing functions described herein, and may include single or multiple core processors, as well as combinations thereof. Processors 305 may be included in a single computing device, or may represent processing elements aggregated across networked devices, such as user devices 145 and 240 (see FIGS. 1-2), terminals 205 (see FIG. 2), etc.

Memory 310 may include a variety of computer-readable media selected for their size, relative performance, or other capabilities: volatile and/or non-volatile media, removable and/or non-removable media, etc. Memory 310 may include cache, random access memory (RAM), storage, etc. Storage included as part of memory 310 may typically provide a non-volatile memory for the networked computing devices (e.g., servers 210*a* through 210*x* shown in FIG. 2), and may include one or more different storage elements such as Flash memory, hard disk drives, solid state drives, optical storage devices, and/or magnetic storage devices. Memory 310 may be included in a single computing device or an aggregation of memory in networked devices.

Memory 310 may include a collection of modules 311 for performing various functions described herein. Each module 311 stores program code executed by the processors 305. As shown, modules 311 include a user identification module 312, an item identification module 314, a virtual cart module 320, an assistance module 322, a security module 324, a power management module 326, an audit module 330, a loyalty program module 332, an inventory module 334, and an unmanned vehicle control module 360. The modules 311 may also interact with one another. For example, a loyalty program module 332 may make calls to a user identification module 312 (e.g., to perform user identification), an item identification module 314, etc. Memory 310 may also include customer profiles 336 and customer images 338, which may be accessed and modified by the modules 311.

The customer profiles 336 and customer images 338 may be stored within one or more databases on the servers 210*a* through 210*x* or in a database separate from the store 200.

Unmanned vehicle control module 360 may send commands interpreted by the unmanned vehicles (e.g., "go to end of aisle 13"). Additionally, unmanned vehicle control module 360 may control unmanned vehicles by sending detailed commands (e.g., "turn right 35°" or "rise 27 inches") to the unmanned vehicles.

I/O subsystem 350 may include a number of different devices used to provide input/output data to the POS system 300, e.g., sensors 220. I/O subsystem 350 may also include input devices 352 and output devices 354. POS terminals 105, terminals 205, user devices 240, and other devices 250 may include displays or audio speakers and various input devices 352 (such as cameras, keyboards or keypads, touchscreens, buttons, inertial sensors, etc.). I/O subsystem 350 includes wireless connections to various unmanned vehicles 260*a* through 260*z*. I/O subsystem 350 may further include connections to an external network 356. Network 356 may be a local area network (LAN), a general wide area network (WAN), and/or a public network (e.g., the Internet). In one embodiment, computing devices of the system 300 connect to a common LAN and one or more computing devices connect the LAN to the Internet.

POS system 300 operates unmanned vehicles to enhance the shopping experience for customers. Enhancing the shopping experience may include finding desired items, recognizing shopper behaviors, etc. In addition, unmanned vehicles may also perform actions desired by the retailer. Actions desired by the retailer may include observing behaviors of customers (e.g., what are the customers looking at, where do the customers pause) delivering messages (e.g., advertising) to the customers, capturing movement of items (e.g., capturing the customer putting an item in a shopping basket for use in completing a sale transaction with the customer), and identifying items (e.g., if a POS terminal fails to identify an item, the POS system may summon an unmanned vehicle to take a picture of the item from another viewpoint).

Figure 4:
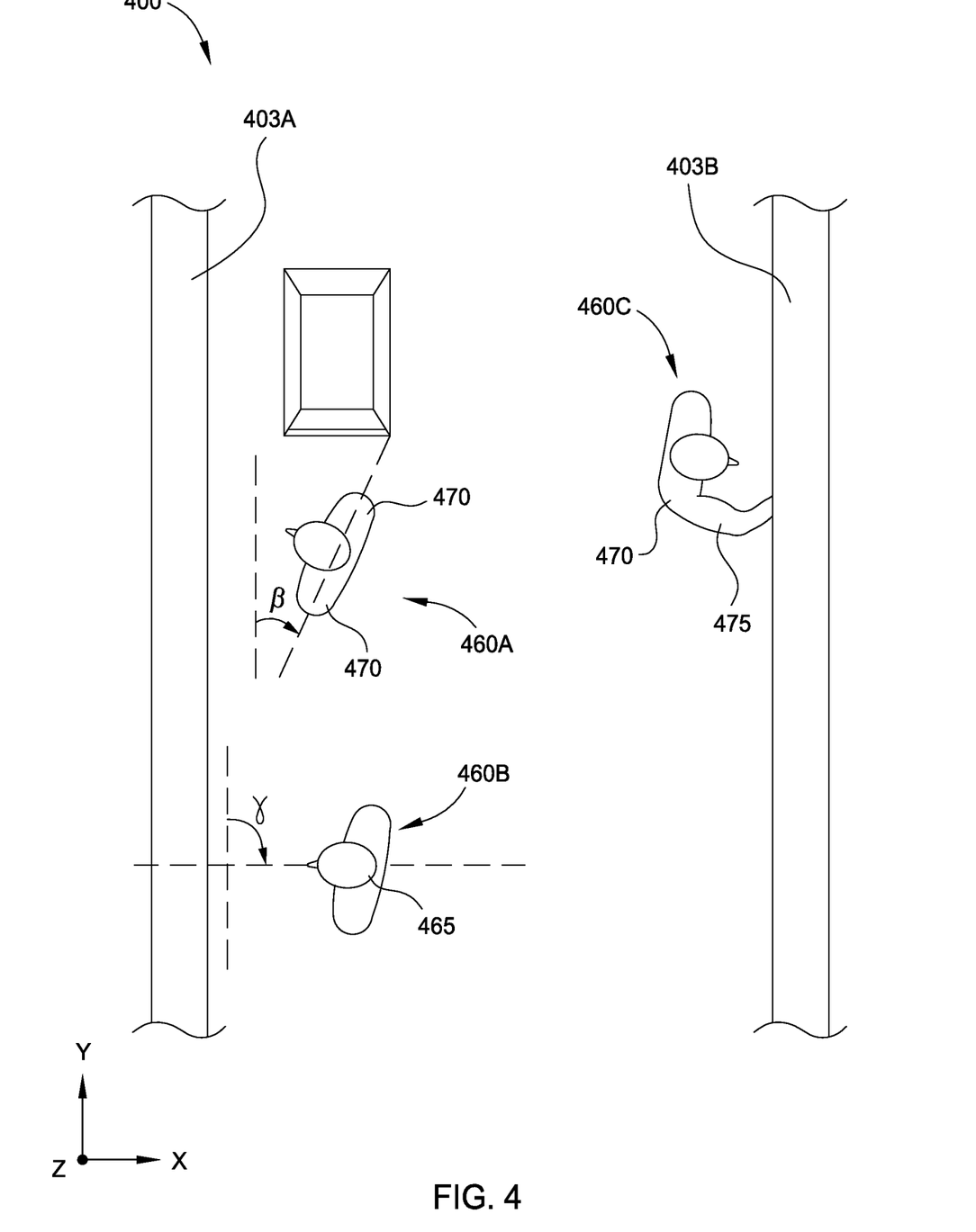
FIG. 4 illustrates an overhead view of a store, according to aspects of the present disclosure.

FIG. 4 illustrates an overhead view 400 of customers 460 in a store. In one embodiment, the view shown in FIG. 4 may be captured by a camera on an unmanned vehicle.

Aspects of the overhead view 400 captured in images may be used to estimate a customer's field of view. For example, a POS system may estimate the orientation of customer 460A using the relative position of his/her shoulders 470. A POS system may compare a line connecting the two shoulders to a reference direction or plane (e.g., parallel to the length of shelving unit 403A) and represented by an angle β. In another example, a POS system may estimate the orientation of customer 460B using the orientation of his/her head 465, comparing a direction of the customer's head to a reference direction or plane, which may be represented by an angle γ. Images may also capture a customer 460C interacting with the shelving unit 403B, and the position and/or orientation of the customer's arm 475 may be used to determine the customer's field of view. The customer's field of view may be used by a POS system to determine items that have attracted the customer's attention and items that the customer is indicating by gesture (e.g., items the customer wants added to the customer's order). Images may also be used to determine a distance between the customer and one or more items on shelving unit 403B. The distance from the customer to various items on the shelves may be combined with information about the customer's field of view and other information to determine items that have attracted the customer's attention.

Figure 5:
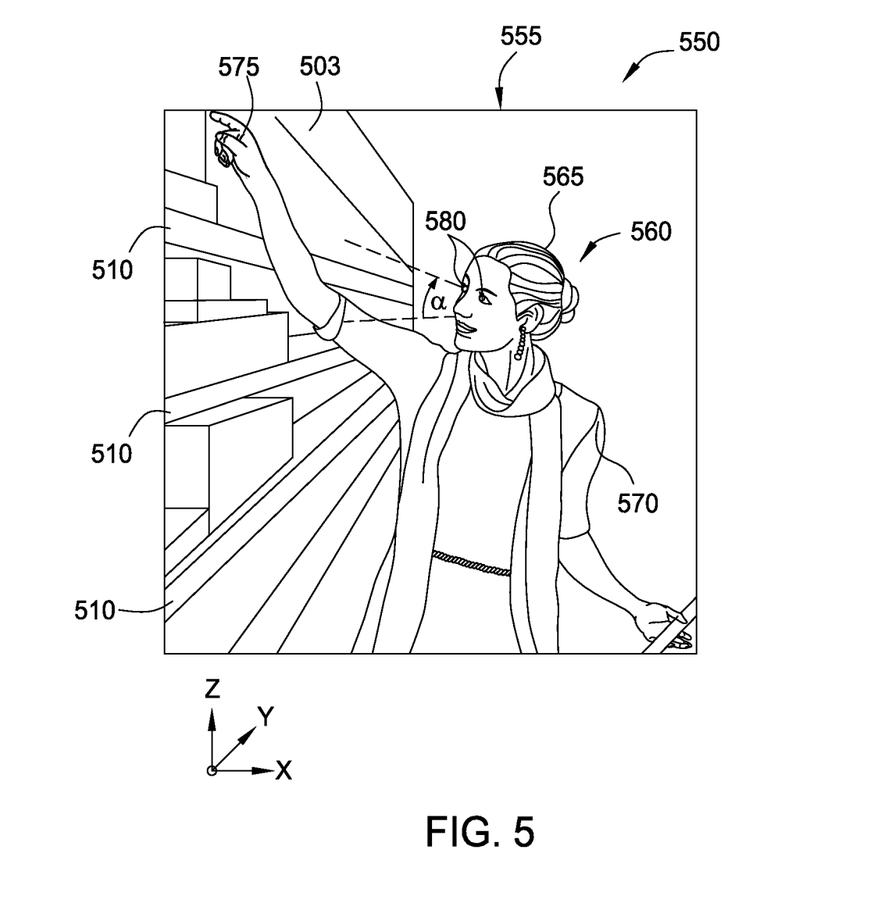
FIG. 5 illustrates a customer in a store, according to aspects of the present disclosure.

FIG. 5 depicts a customer 560 in a store, such as the store 100. As shown, customer 560 is standing in an aisle 555 adjacent to a shelving unit 503 and shelves 510. Visual sensors carried by unmanned vehicles, such as unmanned vehicle 160, may capture images of the scene 550 from various perspectives, and a POS system may use the images to determine the customer's field of view. Specifically, aspects of the scene captured in the images may be used to estimate the customer's field of view.

In one embodiment, the relative position and orientation of portions of the customer's body may be determined. For example, the POS system may determine a position and orientation of the customer's eyes 580. Eye position within the environment may be defined using Cartesian coordinates (i.e., determining x, y, and z-direction values) and eye orientation may be represented by an angle α defined relative to a reference direction or plane (such as horizontal or an x-y plane corresponding to a particular value of z). Other portions of the customer's body may be used to determine the field of view, such as a position and orientation of the customer's head 565 or of shoulders 570. In other embodiments, the customer's interaction with the shelving unit 503 by extending her arm 575 may be captured in one or more images, and the direction of the extended arm may be used to determine her field of view.

Of course, combinations of aspects of the scene can be used to determine the customer's field of view. In some embodiments, the combinations may be weighted; for example, data showing a customer 560 reaching out her arm 575 towards a specific item may be weighted more heavily to determine her field of view than the orientation of her shoulders. In some embodiments, the weights may be dynamically updated based on the customer's shopping behaviors following an estimate of the customer's field of view. For example, if a customer reaches for (or selects) an item that was not included in the field of view, the system may adjust the relative weighting to more fully capture the customer's field of view. This adjustment may include determining correlation values between particular captured aspects of the scene to the selected item; for example, the customer's head may be partly turned towards the selected item, but their eye orientation may generally be more closely tied to the selected item. In some embodiments, the correlation values may be more useful where one or more aspects of the scene cannot be determined (e.g., the system may be unable to determine eye orientation for a customer wearing sunglasses, non-optimal visual sensor positioning, etc.).

A customer (e.g., customer 560) may indicate an item while making a gesture or speaking, and a nearby unmanned vehicle may use a camera and/or microphone to capture the customer's actions for interpretation by a POS system. For example, a customer may perform a gesture, such as pointing at a bar-code label on a box of corn flakes for two seconds, indicating the customer wishes to purchase an item that the customer is pointing at, and a nearby unmanned vehicle captures the customer's actions on video and passes the imagery to the POS system. In the example, the POS system interprets the gesture, determines that the customer is pointing at a box of corn flakes, adds a box of corn flakes to a transaction for the customer, and causes a box of corn flakes to be placed in a carry-out package (e.g., a bag or cart) for the customer. As another example, a customer may point at a bottle of soda and say, "I want two of those," and a nearby unmanned vehicle may capture sounds and images of the scene and pass them along to the store's POS system. In the second example, the POS system interprets the customer's words in the context of the captured images, adds two bottles of soda to a transaction for the customer, and causes two bottles of soda to be placed in a carry-out package for the customer.

According to aspects of the present disclosure, an unmanned vehicle may determine that a face is in an image taken by the unmanned vehicle. The unmanned vehicle may then maneuver (e.g., to get a better view of the face) or determine to transmit the image to a POS system, based on the determination that a face is in the image. For example, an unmanned vehicle may capture an image of a customer pointing at an item (e.g., to purchase the item) from the side of the customer's face, and the unmanned vehicle may maneuver to capture an image of front view of the customer's face.

An unmanned vehicle equipped with a camera and network connectivity (e.g., Wi-Fi) may send data regarding scanned and/or recognized items to a point-of-sale (POS) system to build a transaction for payment at a POS terminal (e.g., a kiosk) or using a mobile device (e.g., a smartphone). For example, a customer may select items and place the items in a basket while a nearby unmanned vehicle captures bar-codes of the items. In the example, the unmanned vehicle transmits the bar-codes to a POS system in the store. Still in the example, the customer can go to a POS terminal, be recognized, and pay for the selected items without scanning the items at the POS terminal because the unmanned vehicle has already sent the bar-codes (or other information about the items) to the POS system.

An unmanned vehicle may capture an image of a gesture by a customer and send that image to a POS system, and the POS system may present offers, promotions, and recommendations to a customer, based on a determination of the gesture in the image sent by the unmanned vehicle. For example, a POS system may determine that a customer that avoids sugar has made a gesture indicating the customer wants to purchase a bottle of apple juice sweetened with sugar, and the POS system may cause a speaker near the customer (e.g., on the unmanned vehicle) to play a message saying "That brand of apple juice contains sugar, but the brand on the shelf below it is sugar-free."

An unmanned vehicle may observe a customer make a gesture indicating the customer is asking whether a store has an item in inventory and send image(s) of the gesture to a POS system. The POS system may determine that the customer is asking whether the store has the item in inventory, and the POS system may associate a camera on the unmanned vehicle or another unmanned vehicle with a customer device to enable the customer to view the inventory of the store at another location. For example, a customer may show a picture of a toy from an advertisement to an unmanned vehicle, and the unmanned vehicle may send images of the customer and advertisement to a POS system. In the example, the POS system operates another unmanned vehicle to capture images of a toy aisle of the store and sends the images of the toy aisle to the customer's smartphone, enabling the customer to see that the toy is in stock.

According to aspects of the present disclosure, an unmanned vehicle equipped with a camera, network connectivity, and an audio output device may provide localized audio assistance to a customer. That is, the unmanned vehicle may play an audio message to a customer from nearby the customer. For example, a customer may say to an unmanned vehicle, "I need a bag of sugar." In the example, the unmanned vehicle may play an audio message (e.g., at the direction of a POS system) saying "Sugar is on aisle fourteen." Additionally or alternatively, an unmanned vehicle may retrieve items from other areas of the store on behalf of shoppers and/or store associates. In an example, a customer may say to an unmanned vehicle, "I need a pint of sour cream," and the unmanned vehicle leaves the customer and gets a pint of sour cream from a far corner of the store and delivers it to the customer.

An unmanned vehicle may be used to guide shoppers. For example, a customer may ask where to find frozen orange juice, and a POS system may direct an unmanned vehicle to play an audio message saying "Follow me!" In the example, the POS system directs the unmanned vehicle to proceed to a freezer holding frozen orange juice while staying within four feet of the customer.

According to aspects of the present disclosure, an unmanned vehicle may track a particular customer's whereabouts. For example, a customer may request that an unmanned vehicle follow a child associated with the customer, and the customer could be kept aware of the child's location (e.g., by imagery displayed on the customer's wireless device) within the store while the customer and child are separated. Unmanned vehicles may also hand off information about a shopper, transaction, etc. to another unmanned vehicle. An unmanned vehicle may be assigned to a particular area of a store, and may hand off information regarding a customer to another unmanned vehicle when the customer is leaving the area assigned to the unmanned vehicle. For example, an unmanned vehicle capturing produce selected by a customer for a transaction transmit the transaction ID number to an unmanned vehicle in the dairy section, when the customer leaves the produce section for the dairy section.

Multiple unmanned vehicles may be connected with at least one customer. For example, a customer may request a first unmanned vehicle retrieve a package of bacon while a second unmanned vehicle follows the customer and responds to questions from the customer.

According to aspects of the present disclosure, an unmanned vehicle used in a POS system could be store supplied or customer supplied. For example a customer may bring an unmanned vehicle to a store, and a POS system at the store may cooperate with the shopper's unmanned vehicle by supplying navigation commands.

An unmanned vehicle may assist a customer in a parking lot of the store. For example, an unmanned vehicle may meet a customer in a parking lot and obtain a shopping list listing bananas, strawberries, bread, and milk from the customer. In the example, the unmanned vehicle displays a message saying "We have all of your items, and strawberries are on special."

Unmanned vehicles may possess anti-collision and collusion capabilities. For example, a POS system may direct two unmanned vehicles serving different customers to proceed to different areas of the store, and the unmanned vehicles may coordinate their movements to avoid colliding. In a second example, a POS system may direct two unmanned vehicles to observe a customer, and the two unmanned vehicles may communicate with each other to cooperate in gathering images of the customer from widely varying points of view.

Figure 6:
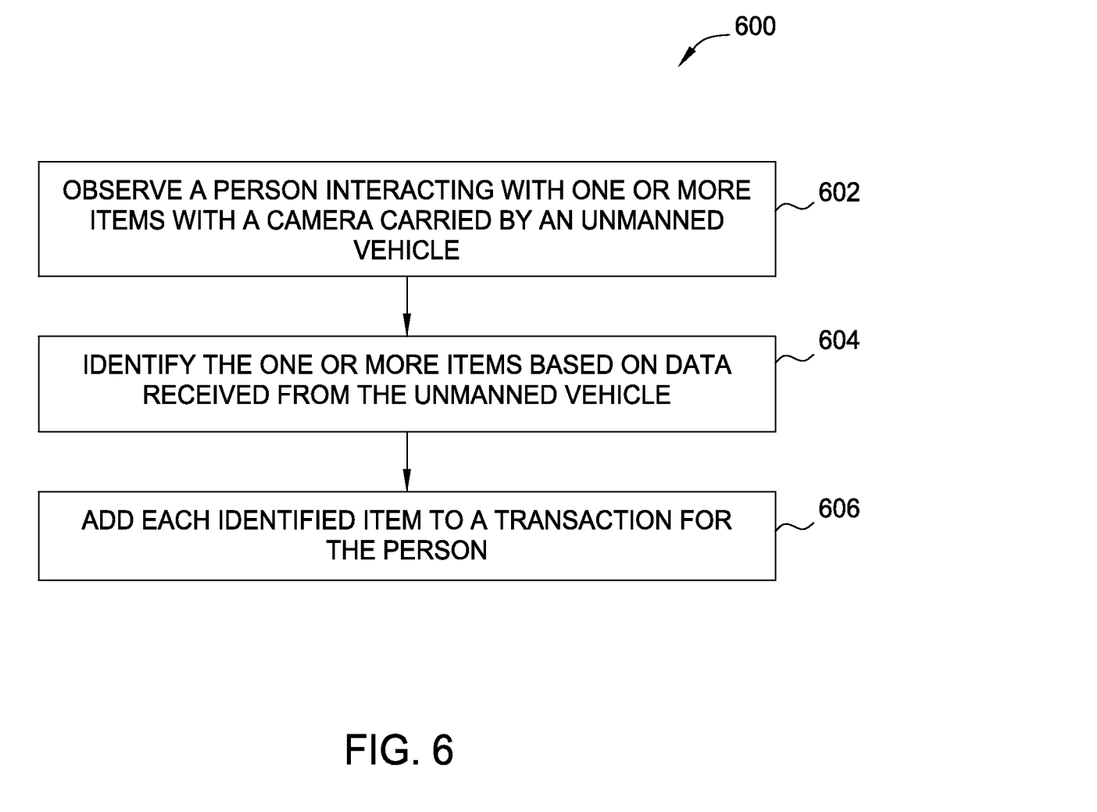
FIG. 6 illustrates an exemplary method for enhancing the shopping experience, according to aspects of the present disclosure.

FIG. 6 illustrates a method 600 for operating a retail environment. Method 600 may be performed by, for example, a POS system while using an unmanned vehicle.

Method 600 begins at step 602, where a POS system observes a person interacting with one or more items with a camera carried by an unmanned vehicle. For example, POS system 300 observes a customer 560 picking up a bag of chips in a store aisle 555 from a camera carried by unmanned vehicle 160.

At step 604, method 600 continues by the POS system identifying the one or more items based on data received from the unmanned vehicle. In the example above, the POS system 300 identifies the bag of chips as an eleven ounce bag of Fritos® brand corn chips, for example, based on the image.

At step 606, method 600 continues by the POS system adding each identified item to a transaction for the person. Continuing the example, the POS system 300 adds the eleven ounce bag of Fritos® brand corn chips to a transaction for customer 560.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer program product, the computer program product including processor executable instructions that enable a processor to perform operations comprising:
   observing, with a first camera carried by an unmanned vehicle associated with a first region in an environment, a person requesting an item available for selection by the person;
   receiving an audio request, via a microphone on the unmanned vehicle, from the person;
   determining, by the processor, that the audio request indicates that the person is inquiring about the requested item;
   identifying, by the processor, the requested item from an image captured by the first camera of the person indicating the requested item to the unmanned vehicle;

determining, by the processor, based on the image, a second camera located in a second region of the environment, different from the first region, where the requested item is stored;

linking, by the processor, the second camera with a personal computing device associated with the person; and outputting, by the processor, a series of images captured by the second camera to the personal computing device.

2. The computer program product of claim 1, wherein the unmanned vehicle is an unmanned aerial vehicle (UAV).

3. The computer program product of claim 1, wherein observing the person comprises directing the unmanned vehicle, by the processor, to capture an image of an unidentified item with the camera.

4. The computer program product of claim 1, wherein the operations further comprise:

receiving a request from the person for a location of a desired item; and navigating the unmanned vehicle to the location of the desired item while staying within a predefined distance from the person.

5. The computer program product of claim 1, wherein the operations further comprise:

receiving, by the unmanned vehicle, a request from the person for a requested item; and retrieving the requested item via the unmanned vehicle.

6. A system, comprising:

a computer processor; and a memory containing program code which, when executed by the computer processor, causes the system to:

acquire, by a first camera of an unmanned vehicle, an image indicating that a person at a first location in an environment is requesting an item that is available for selection by the person, wherein to acquire the image indicating that the person is requesting the item, the program code further causes the system to:

receive the image from the unmanned vehicle;

determine that the person is making a gesture in the image; and determine that the gesture indicates that the person is inquiring about the item;

identify a second camera at a second location, different from the first location, in the environment, wherein the second location is associated with the item;

link the second camera in the environment with a computing device associated with the person; and send a series of images captured by the second camera to the computing device.

7. The system of claim 6, wherein the gesture includes showing an image of the item to the first camera.

8. The system of claim 6, wherein the second camera is carried by a second unmanned vehicle, different from the unmanned vehicle carrying the first camera.

9. The system of claim 6, wherein the series of images enable the person to determine whether the item is in stock.

10. The system of claim 6, wherein the program code further causes the system to:

play, via the unmanned vehicle, an audio message identifying the second location within the environment to the person.

11. The system of claim 6, wherein the program code further causes the system to:

identify a second item to the person, different from the item based on the item.

12. The system of claim 6, wherein the program code further causes the system to:

receive an audio request, via a microphone carried by the unmanned vehicle, from the person; and determine that the audio request indicates that the person is inquiring about the item.

13. A system, comprising:

a computer processor; and a memory containing program code which, when executed by the computer processor, causes the system to:

acquire, by a first camera of an unmanned vehicle, an image indicating that a person at a first location in an environment is requesting an item that is available for selection by the person;

identify a second camera at a second location, different from the first location, in the environment, wherein the second location is associated with the item;

link the second camera in the environment with a computing device associated with the person;

send a series of images captured by the second camera to the computing device; and play, via the unmanned vehicle, an audio message identifying the second location within the environment to the person.

14. The system of claim 13, wherein to acquire the image indicating that the person is requesting the item, the program code further cause the system to:

receive the image from the unmanned vehicle;

determine that the person is making a gesture in the image; and determine that the gesture indicates that the person is inquiring about the item.

15. The system of claim 14, wherein the gesture includes showing an image of the item to the first camera.

16. The system of claim 13, wherein the second camera is carried by a second unmanned vehicle, different from the unmanned vehicle carrying the first camera.

17. The system of claim 13, wherein the series of images enable the person to determine whether the item is in stock.

18. The system of claim 13, wherein the program code further causes the system to:

identify a second item to the person, different from the item based on the item.

19. The system of claim 13, wherein the program code further causes the system to:

receive an audio request, via a microphone carried by the unmanned vehicle, from the person; and determine that the audio request indicates that the person is inquiring about the item.

* * * * *